US012806956B2

(12) United States Patent
Etholen et al.

(10) Patent No.: US 12,806,956 B2
(45) Date of Patent: Nov. 24, 2026

(54) SYSTEM AND METHOD FOR REGULATING DAMPING FORCE OF A VEHICLE

(71) Applicant: THE-Enterprise Oy, Vantaa (FI)

(72) Inventors: Aleksi Etholen, Vantaa (FI); Jarl Lindholm, Vantaa (FI)

(73) Assignee: THE-Enterprise Oy, Vantaa (FI)

( * ) Notice: Subject to any disclaimer, the term of this patent is extended or adjusted under 35 U.S.C. 154(b) by 158 days.

(21) Appl. No.: 18/739,811

(22) Filed: Jun. 11, 2024

(65) Prior Publication Data

US 2025/0001827 A1 Jan. 2, 2025

(30) Foreign Application Priority Data

Jun. 28, 2023 (FI) ..................................... 20235745

(51) Int. Cl.
*B60G 17/06* (2006.01)

(52) U.S. Cl.
CPC .......... *B60G 17/06* (2013.01); *B60G 2400/10* (2013.01); *B60G 2400/204* (2013.01); *B60G 2400/84* (2013.01); *B60G 2401/142* (2013.01); *B60G 2401/16* (2013.01); *B60G 2500/10* (2013.01)

(58) Field of Classification Search
CPC ................ B60G 17/0165; B60G 17/06; B60G 2400/10; B60G 2400/204; B60G 2400/821; B60G 2400/84; B60G 2400/843; B60G 2400/90; B60G 2401/142; B60G 2401/16; B60G 2500/10
See application file for complete search history.

(56) References Cited

U.S. PATENT DOCUMENTS

2014/0195112 A1* 7/2014 Lu ........................ B60G 17/015 703/2
2015/0224845 A1* 8/2015 Anderson ............... F03G 7/081 701/37

(Continued)

FOREIGN PATENT DOCUMENTS

WO 2023047201 A1 3/2023

OTHER PUBLICATIONS

European Patent Office, Extended European Search Report, Application No. 24182160.2, mailed Nov. 21, 2024, 8 pages.

(Continued)

*Primary Examiner* — Carl C Staubach
(74) *Attorney, Agent, or Firm* — Ziegler IP Law Group, LLC.

(57) ABSTRACT

A system for regulating damping force of vehicle, includes a sensor arrangement configured to sense data related to characteristic(s) of an upcoming path of the vehicle; software application executable on user device associated with user, wherein software application is configured to receive sensed data from sensor arrangement communicably coupled with software application; and process sensed data to predict damping force value(s) based on characteristic(s) of upcoming path of vehicle; and control arrangement communicatively coupled with software application and operatively coupled with actuator(s), wherein actuator(s) is coupled with damping system of vehicle, and wherein control arrangement is configured to control actuator(s) to regulate damping force based on predicted damping force value(s).

15 Claims, 7 Drawing Sheets

(56) References Cited

U.S. PATENT DOCUMENTS

| | | | | |
|---|---|---|---|---|
| 2021/0155228 | A1 | 5/2021 | Van et al. | |
| 2022/0025945 | A1* | 1/2022 | Heumoos | H01F 7/1844 |
| 2022/0025954 | A1* | 1/2022 | Pickett | B62K 25/06 |
| 2022/0105770 | A1 | 4/2022 | Furuta | |
| 2022/0234408 | A1* | 7/2022 | Jonson | B60G 17/016 |
| 2022/0281280 | A1* | 9/2022 | Praet | B60G 17/06 |
| 2025/0001827 | A1* | 1/2025 | Etholén | B60G 17/0165 |

OTHER PUBLICATIONS

Finnish Patent and Registration Office, Search Report, Application No. 20235745, dated Apr. 10, 2023, 2 pages.

* cited by examiner

SYSTEM AND METHOD FOR REGULATING DAMPING FORCE OF A VEHICLE

TECHNICAL FIELD

The present disclosure relates to systems for regulating a damping force of a vehicle. Moreover, the present disclosure relates to methods for regulating a damping force of a vehicle.

BACKGROUND

Typically, damping systems are an essential part of any vehicle to provide stability and comfort while travelling in the vehicle. Such damping systems generally involve shock absorbers that produce a damping force to absorb any shocks and vibrations that are imparted on the vehicle due to one or more factors such as bumps or potholes on a road over which the vehicle moves. The damping force is accordingly adjusted to alter the damping effect by using hydraulic fluid in the shock absorbers. Thus, adjustment in the damping force enables the vehicle to adapt to changing road conditions.

However, in present solutions the damping force is started to be adjusted after a time delay when the shocks and vibrations are already acting upon the vehicle and thus, the effect of absorbing the shocks and vibrations by the damping force is significantly reduced. Moreover, because of the time delay in adjusting the damping force, people travelling inside the vehicle have to undergo an unpleasant experience due to delay in absorbing the shocks and vibrations that are imparted on the vehicle.

Therefore, in light of the foregoing discussion, there exists a need to overcome the aforementioned drawbacks.

SUMMARY

The aim of the present disclosure is to provide a system and a method to effectively control a damping force of a vehicle. The aim of the present disclosure is achieved by a system and a method for regulating a damping force of a vehicle, as defined in the appended independent claims to which reference is made to. Advantageous features are set out in the appended dependent claims.

In a first aspect, an embodiment of the present disclosure provides a system for regulating a damping force of a vehicle, according to claim 1.

In a second aspect, an embodiment of the present disclosure provides a method for regulating a damping force of a vehicle, according to claim 12.

Throughout the description and claims of this specification, the words “comprise”, “include”, “have”, and “contain” and variations of the words, for example “comprising” and “comprises”, mean “including but not limited to”, and do not exclude other components, integers or steps. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
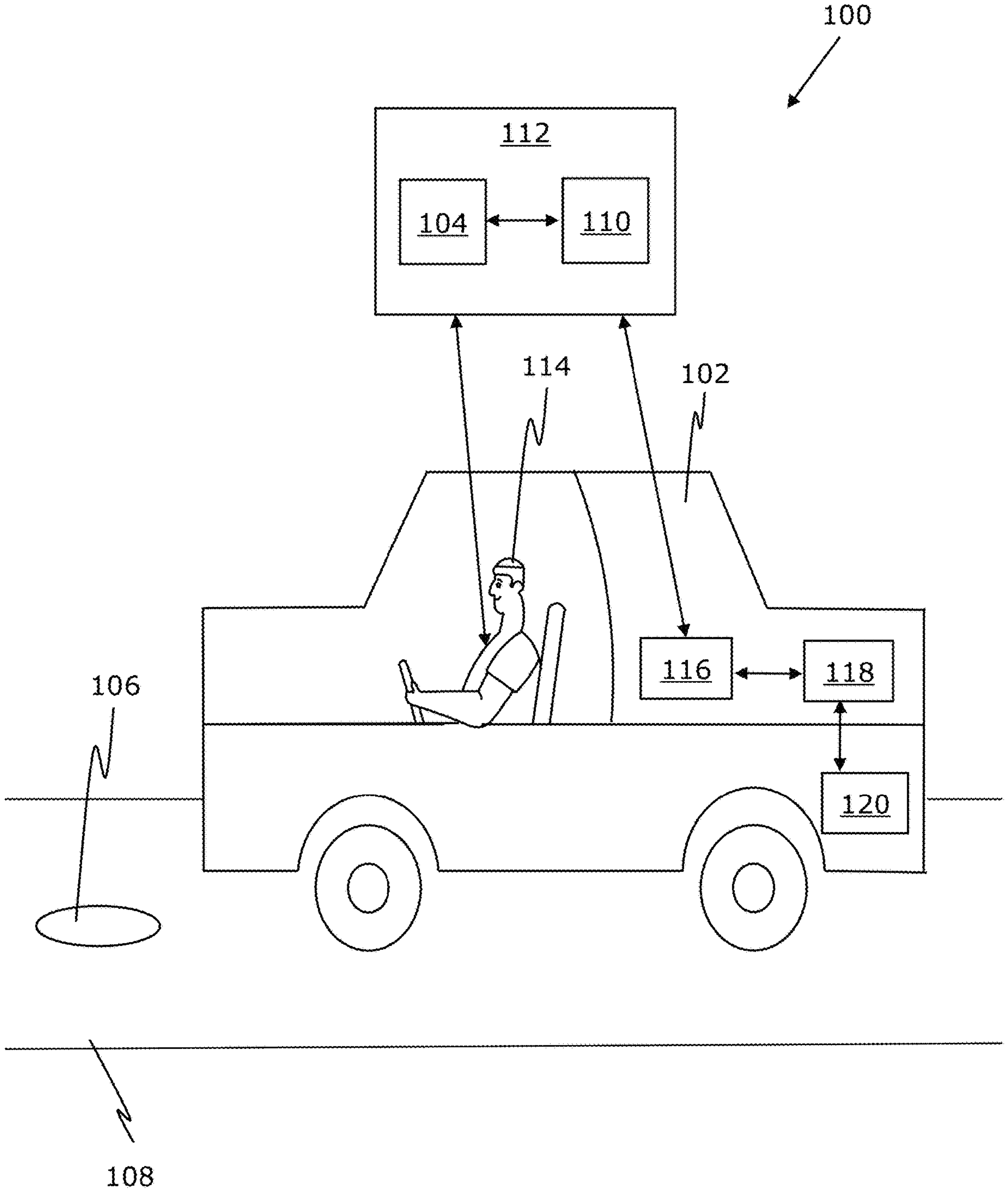
FIG. 1 is an environment for implementing a system for regulating a damping force of a vehicle, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system for regulating a damping force of a vehicle, the system comprising:

- a sensor arrangement configured to sense data related to at least one characteristic of an upcoming path of the vehicle;
- a software application executable on a user device associated with a user, wherein the software application is configured to:
  - receive the sensed data from the sensor arrangement communicably coupled with the software application; and
  - process the sensed data to predict at least one damping force value based on the at least one characteristic of the upcoming path of the vehicle; and
- a control arrangement communicatively coupled with the software application and operatively coupled with at least one actuator, wherein the at least one actuator is coupled with a damping system of the vehicle, and wherein the control arrangement is configured to control the at least one actuator to regulate the damping force based on the predicted at least one damping force value.

In a second aspect, the present disclosure provides a method for regulating a damping force of a vehicle, wherein the method comprising:

- sensing data related to at least one characteristic of an upcoming path of the vehicle;
- receiving the sensed data in a software application from a sensor arrangement communicably coupled with the software application;
- processing the sensed data for predicting at least one damping force value based on the at least one characteristic of the upcoming path of the vehicle; and
- controlling an at least one actuator operatively coupled with a damping system for regulating the damping force based on the predicted at least one damping force value, via a control arrangement communicatively coupled with the software application and operatively coupled with the at least one actuator.

The present disclosure provides the aforementioned system and the aforementioned method for regulating a damping force of a vehicle. The system is designed to predict the at least one damping force value for the vehicle that enables timely adjustment and regulation of the damping force in the vehicle without any significant time delay. In this regard, the system uses the software application to predict the at least one damping force value which enables the system to automate the regulation of the damping force effectively and accurately in the vehicle. Moreover, the timely regulation of the damping force in the vehicle enables to effectively absorb any shocks or vibrations that are imparted on the vehicle, which provides a more stable, comfortable and pleasant experience to passengers in the vehicle.

Throughout the present disclosure, the term "damping force" refers to a force that is generated by shock absorbers in a suspension system in the vehicle. Notably, the damping force is generated to resist and absorb energy from any shocks and vibrations imparted upon the vehicle due to factors associated with a path of the vehicle (such as potholes or speed breakers in the path, and the like). Subsequently, regulating the damping force (i.e., increasing or decreasing the damping force) is essential for smooth driving of the vehicle as efficient and timely regulation of the damping force leads to effectively and timely absorbing the shocks and vibrations imparted upon the vehicle.

The system comprises the sensor arrangement configured to sense the data related to the at least one characteristic of the upcoming path of the vehicle. Throughout the present disclosure, the term "sensor arrangement" refers to an arrangement of sensors that senses and collects data or information related to specific characteristics or parameters. Notably, in the system the sensor arrangement senses the data related to the at least one characteristic of the upcoming path of the vehicle. Optionally, the sensor arrangement is installed in a chassis of the vehicle. Alternatively, the sensor arrangement is installed in the user device of the user. Alternatively, optionally, a first number of the sensors from the sensor arrangement are installed in the chassis of the vehicle, and a remaining number of the sensors from the sensor arrangement are installed in the user device of the user.

Throughout the present disclosure, the term "upcoming path" refers to a path over which the vehicle is to move in a future moment of time. Optionally, a range of the upcoming path of the vehicle is up to 1000 kms. Thus, optionally, the system operates to regulate the damping force in the vehicle for up to a journey of 1000 kms. It will be appreciated that the at least one characteristic of the upcoming path of the vehicle relates to those parameters or properties which impacts the vehicle while moving on the upcoming path in a way that requires the damping force in the vehicle to be regulated for smooth movement of the vehicle (such as bumps on the upcoming path that impart the shocks and the vibrations on the vehicle). For example, the at least one characteristic of the upcoming path of the vehicle comprises a condition of the upcoming path of the vehicle (such as presence of any potholes on the upcoming path of the vehicle) and weather on the upcoming path to be raining. Optionally, the at least one characteristic of the upcoming path includes different characteristics for different respective parts of the upcoming path of the vehicle. For example, for a first part of the upcoming path of the vehicle, the at least one characteristic comprises the first part of the upcoming path to be of asphalt type and a width of 10 meters, whereas, for a second part of the upcoming path of the vehicle, the at least one characteristic comprises the second part of the upcoming path to be of gravel type and a width of 8 meters.

Optionally, the at least one characteristic of the upcoming path or characteristics of the vehicle comprises at least one:

characteristic of an upcoming route of the vehicle;
driving characteristic of the vehicle;
speed of the vehicle;
configuration of the damping system;
acceleration of the vehicle;
orientation of the vehicle; or
weather data.

In this regard, the at least one characteristic of the upcoming route of the vehicle includes parameters such as conditions and/or dimensions of the upcoming route (i.e., terrain or road on which the vehicle is expected to move in a future moment of time), for example, presence of bumps or potholes on the upcoming route of the vehicle. Herein, the at least one driving characteristic of the vehicle includes parameters such as:

body movement: the vehicle's body will experience more pronounced vertical movements due to the unevenness of the road surface. This can result in a bouncing or jolting motion as the vehicle encounters bumps and potholes;

suspension system response: the suspension system plays a crucial role in absorbing the impact from bumps and maintaining tire contact with the road. On a bumpy road, you may notice the suspension compressing and extending to minimize the transfer of shocks to the vehicle's body.

vibrations: bumps on the road can cause vibrations that can be felt throughout the vehicle. These vibrations may be more pronounced in the steering wheel, seats, and other components;

noise: bumpy roads often generate increased noise levels inside the vehicle. This can be due to the rattling of loose objects, the vibrations transmitted through the body, or the tires making contact with the uneven road surface;

handling and stability: The handling of the vehicle may be affected on bumpy roads. The tires may lose traction momentarily when encountering larger bumps, leading to a slight loss of control. The vehicle's stability, especially at higher speeds, can also be compromised due to the irregular road surface; and/or comfort: the overall ride comfort is usually reduced on bumpy roads. The constant jarring and bouncing can lead to a less comfortable experience for the vehicle occupants, particularly if the suspension system is not well-designed or tuned for such conditions. These driving characteristics may vary depending on the specific vehicle's design and suspension system; and/or the driving mode, which regulates the engine power and powerline and suspension characteristics, for example when the vehicle is heavy loaded more power is needed and the powerline is adjusted according to the power output of the engine and needed acceleration, speed, drivability.

Herein the at least one speed of the vehicle includes parameters such as linear velocity and/or angular velocity of the vehicle. Moreover, the at least one orientation of the vehicle includes change in angles such as roll, pitch and yaw which describes orientation of the vehicle in a three-dimensional (3D) space. Notably, regulation in the damping force is required based on the at least one orientation of the vehicle. For example, when the vehicle is turning towards a left direction, then the damping force in a right portion of vehicle is needed to be increased to a higher value. The technical effect is that the at least one characteristic of the upcoming path includes every possible factor that is related to the vehicle which requires the damping force in the vehicle to be adjusted.

Optionally, if the at least one characteristic of the upcoming route is above or below the predicted at least one damping force value there is an alarm signal generated based on e.g., a change of the G-force, vibration or an angle of the vehicle. The alarm signal can be sound in the sound system of the vehicle or in the user device, light on the display of the vehicle or in the user device, vibration in a steering wheel, pedal or in the seat of driver of the vehicle, automatic reduction of speed of the vehicle, automatic braking of the vehicle.

Optionally, the sensor arrangement comprises at least one of: a Global Positioning System (GPS) sensor, a speedometer, a camera, an Inertial Measurement Unit (IMU) sensor, a sound level meter (SLM). Notably, each of different sensors present in the sensor arrangement plays an essential role in collecting information that is relevant in analyzing the at least one characteristic of the upcoming path of the vehicle and determining how the damping force in the vehicle is to be regulated. Herein, the GPS sensor is used to determine what is a current location of the vehicle, what the upcoming path of vehicle is going to be, the condition of the upcoming path of the vehicle (for example, if the upcoming path is of gravel type or asphalt type, and the like). Likewise, the speedometer determines a current speed of the vehicle which helps to determine how much the damping force needs to be regulated to achieve an ideal speed for the vehicle on the upcoming path. Likewise, the camera determines the condition of the upcoming path of the vehicle (for example, if there are any bumps or potholes in the upcoming path, and the like). Optionally, the camera is an infrared camera. Likewise, the IMU sensor determines a current position and orientation of the vehicle which helps to determine how the damping force needs to be regulated for the vehicle to effectively adjust to the conditions of the upcoming path based on the current position and orientation of the vehicle.

Typically, in a vehicle, a sound level meter (SLM) is used for monitoring and managing sound levels both inside and outside the vehicle. SLMs typically consist of a microphone to pick up sound, an electronic circuitry to process the signal, and a display to show the measured sound level in decibel (dB). SLMs are calibrated to accurately measure sound levels across different frequency ranges and are used to assess compliance with noise regulations, identify sources of excessive noise, and evaluate the effectiveness of noise control measures. Notably, monitoring and managing sound levels in the vehicle enables pleasant driving experience and evaluating the vehicle's noise emissions and compliance with regulatory standards, such as noise pollution regulations, respectively. Generally, SLM is used to assess the noise characteristics of various vehicle parts, such as engines, tires, brakes, HVAC systems and wind, to identify sources of noise and develop strategies for reducing noise levels. Herein, the SLM may be used to assess the noise characteristics of various vehicle parts which may have suffered impact from a given road condition or driving of the vehicle. Optionally, SLMs may be integrated into driver assistance systems to monitor external sound levels and provide alerts to the driver in certain situations, such as detecting emergency vehicles or warning of potential hazards based on sound cues. In some cases, SLMs may be integrated into vehicles to provide real-time feedback to drivers about their driving behaviour and its impact on noise levels. This could encourage more fuel-efficient or quieter driving habits. Beneficially, SLM ensures optimal acoustic performance, comfort, and safety in vehicles by measuring and managing noise levels both inside and outside the vehicle.

Typically, depending on the orientation of the bumps, potholes, rough patches, debris, and other irregularities on the road surface relative to the prevailing wind direction, there may be areas of increased or decreased wind speed along the road. In an exemplary implementation, based on the measured wind noise, by the SLM, on the upcoming path of the vehicle, the real-time feedback, via driver assistance systems, encourages drivers to adopt quieter driving habits, such as smoother acceleration and braking, reducing engine revving, and avoiding rapid acceleration or deceleration, when the upcoming path of the vehicle has a bump or potted road surface (potholes) that alters the wind noise as the vehicle approaches the bump. Notably, quieter driving often correlates with more fuel-efficient driving habits. By integrating SLMs, vehicles can dynamically adjust damping force based on real-time noise levels and road conditions. This allows for optimized suspension tuning, providing a smoother and more comfortable ride for occupants, especially over uneven or rough road surfaces. Moreover, by dynamically adjusting damping force levels based on noise levels and road conditions, the vehicle can achieve better energy absorption and reduced energy loss, contributing to improved fuel economy.

In another exemplary implementation, the GPS and SLM work in conjunction to inform the driver about an upcoming bump, potholes, rough patches, debris, and other irregularities on the road surface on the path of the vehicle, based on the geographical coordinates and the change in wind speed, respectively. Based on such information, the driver assistance system notifies the driver to adjust at least one characteristic of the vehicle accordingly, such as changing direction of the wheels to avoid such irregularities on the road surface, reducing a speed of the vehicle, changing to an alternative route, and so on, that can be implemented prior to actual contact between the vehicle wheels and such irregularities on the road surface.

The technical effect of the sensor arrangement to comprise at least one of: the GPS sensor, the camera, the speedometer, the IMU sensor, the SLM sensor, and the like is that data related different types of factors and parameters that can contribute to determine the at least one characteristic of the upcoming path of the vehicle and to determine how the damping force is to be regulated in the vehicle is effectively monitored and collected by the sensor arrangement. Thus, advantageously, the software application is able to make accurate and precise decisions in predicting the damping force value using the sensed data.

Optionally, the camera in the sensor arrangement is configured to capture signals containing information related to the at least one characteristic of the upcoming path transmitted from at least one another vehicle. Optionally, the at least one another vehicle is moving in front of, on back or passing the vehicle. For example, another vehicle 'A', another vehicle 'B', another vehicle 'C', and so on, might be moving in front of, on back or passing the vehicle at different time points or same time points, each covered by a camera. In this regard, the signals containing the information are infrared signals and the camera used is the infrared camera.

Optionally, the camera is a normal camera using visible light and indicating pulses or light changes from at least one another vehicle.

Alternatively, the camera is a high-speed camera able to identify high speed light pulses from at least one another vehicle. Optionally, the camera is installed on a front, on a back or a side portion of the vehicle to clearly capture the signals from the at least one another vehicle. Optionally the signals containing the information can be transmitted and received between the vehicle and at least one another vehicle by using 2G, 3G, 4G, 5G, 6G, 7G, 8G, WLAN, Bluetooth or UWB type of transmitters and receivers. Optionally, the at least one another vehicle is either moving in front of the vehicle, where the upcoming path for the at least one aa normal camera passes the vehicle in an opposite direction to which the vehicle is moving, and thus, the at least one another vehicle has already moved over the upcoming path of the vehicle. Herein, the information related to the at least one characteristic of the upcoming path is collected by at least one another sensor arrangement of the respective at least one another vehicle. Subsequently, the at least one another vehicle has a transmitter installed in the at least one another vehicle to transmit the signals containing the information related to the at least one characteristic of the upcoming path. The transmitter may be a 2G, 3G, 4G, 5G, 6G, 7G, 8G, WLAN, Bluetooth or UWB type of. The technical effect is that the sensor arrangement of the vehicle is able to beneficially utilize the collected information from the at least one another vehicle that has the same upcoming path or has already moved over the upcoming path of the vehicle to be able to regulate the damping force in a predictive manner.

Moreover, the system comprises the software application executable on the user device associated with the user. Throughput the present disclosure, the term "software application" refers to a software program that runs on a computable device and is designed to perform specific tasks and functions on the computable device. Notably, in the system the user device is the computing device on which the software application is executed. It will be appreciated that the use of the software application in the system makes the system easy to implement as the software application is compatible with a wide variety of electronic devices, one of which is the user device in the system. Herein, the term "user device" refers to an electronic device that has computation capabilities and is associated with the user (i.e., a person that is driving or sitting in the vehicle). The user device can be e.g., a portable computing device, a laptop computer, a tablet computer, a handheld device, a smart phone, a car-mounted computer, a dash cam, a vehicle-based computing device, an in-vehicle companion device, a vehicle-ready computer, an in-vehicle computer, a vehicle computer system, a vehicle computing device, an automotive computing platform, an onboard computer, a vehicle infotainment system, an in-vehicle computing device, a vehicle-based computational user device, an automobile computer, an automotive user device or a like.

The software application is configured to receive the sensed data from the sensor arrangement communicably coupled with the software application. Notably, the software application is capable of performing required processing and analysis of the sensed data and thus, the sensed data is transferred from the sensor arrangement to the software application. Subsequently, the software application uses the communicable coupling which is a two-way communication link established between the software application and the sensor arrangement to receive the sensed data. Optionally, the communicable coupling between the software application and the sensor arrangement is a wireless coupling or a wired coupling.

Moreover, the software application is configured to process the sensed data to predict the damping force value based on the at least one characteristic of the upcoming path of the vehicle. Herein, processing the sensed data involves studying and analyzing the sensed data to determine how the at least one characteristic of the upcoming path impacts the vehicle. Subsequently, depending on what the impact of the at least one characteristic of the upcoming path is, the software application predicts the damping force value for the vehicle. Throughout the present disclosure, the term "at least one damping force value" refers to one or more values of the damping force at which the damping force is to be fixed in the vehicle for the upcoming path. Optionally, the at least one damping force value comprises a plurality of damping force values predicted for a plurality of parts of the upcoming path, wherein a given damping force value is predicted for a respective given part of the upcoming path of the vehicle based on the at least one characteristic of the given part of the upcoming path of the vehicle. Notably, a magnitude of the at least one damping force value to be predicted is determined based on what is the impact of the at least one characteristic of the upcoming path is going to be on the vehicle. For example, the damping force value is predicted to be at a lower value if the upcoming path of the vehicle is sensed to be a flat road. Similarly, the damping force value is predicted to be at a higher value if the upcoming path of the vehicle is sensed to be a road full of bumps.

Optionally, the software application is further configured to enable the user to provide a user input to predict the at least one damping force value. Throughout the present disclosure, the term "user input" refers to an input given by the user to indicate what value of the at least one damping force value is required to be predicted based on assessment of the upcoming path by the user. For example, while driving the vehicle, if the user sees a bump in the upcoming path of the vehicle, then via the user input the user indicates to the software application the at least one damping force value the user wants to be predicted based on the assessment of the upcoming path by the user. Herein, the software application utilizes the camera or a microphone in the sensor arrangement to enable the user to provide the user input. Subsequently, the user input that is captured by the camera or the microphone is received by the sensor arrangement and process the user input along with the sensed data to predict the at least one damping force value. In this regard, the camera or a microphone in the sensor arrangement are arranged such that they receive the user input substantially clearly. In an implementation, the camera and/or the microphone are arranged to face the driver. The technical effect is that the software application is able to successfully integrate the input of the user in predicting the at least one damping force, and thus, advantageously, the system efficiently operates to predict the at least one damping force value even during in a scenario of failure of the sensor arrangement.

Optionally, the user input is provided via at least one of: a voice input, a blinking of eyes, a movement of eyes, a movement of a body part of the user. Herein, the user input is such that specific patterns are recognizable in the user input that enables to process and extract information related to what the at least one damping force value the user wants to be predicted. In this regard, in the voice input, specific words are identified to extract the information related to what the at least one damping force value the user wants to be predicted (for example, words like "higher", "lower", "greater", "lesser", and the like are identified in the voice input to determine whether the user wants to increase the damping force value or decrease the damping force value). Similarly, specific patterns are in the blinking of the eyes are identified to extract the information related to what the at least one damping force value the user wants to be predicted such as a frequency of the blinking of eyes by the user (for example, the user may blink their eyes one time to decrease the at least one damping force value, while the user may blink their eyes to two times to increase the at least one damping force value.

Referring to the above example, while GPS and SLM provide different type of sensed data, the user input, for example a voice input "higher damping force", provides a user-defined specific data to the software application to predict the at least one damping force value and use the predicted data to have the control arrangement to control the at least one actuator to regulate the damping force. Herein, the system for regulating the damping force of the vehicle can adapt damping force values based on driving conditions, road surface characteristics, and driver preferences, thus enabling drivers to customize their driving experience by selecting different damping modes tailored to their comfort, performance, or fuel efficiency preferences.

Optionally, the software application is further configured to:

receive previously stored data related to the at least one characteristic of the upcoming path from a storage unit communicably coupled to the software application; and process the previously stored data and the sensed data to predict the at least one damping force value.

In this regard, the term "previously stored data" as used herein refers to that data related to the at least one characteristic of the upcoming path that has been collected in past and is stored in the storage unit (i.e., a unit that comprises memory to store any kind of data and information). Optionally, the storage unit is in form of a cloud storage database or a third-party server database. Notably, the use of the previously stored data by the software application reduces a computational burden on the sensor arrangement of the vehicle as a significant portion of information related to the at least one characteristic of the upcoming path that is to be collected by the sensor arrangement is already present in the previously stored data. The technical effect is that the software application is able to predict the at least one damping force value more rapidly and efficiently as the significant portion of the information related to the at least one characteristic of the upcoming path that is required to predict the at least one damping force value is already available in the previously stored data of the upcoming path and the remaining portion of the information is processed and collected from the sensed data.

Optionally, the previously stored data is transmitted from the at least one another vehicle. Herein, the previously stored data is formed using data that is collected from the at least one another sensor arrangement of the respective at least one another vehicle that has moved over the upcoming path of the vehicle in the past. The at least one another sensor arrangement is used to measure in the at least one another vehicle at least one of: vehicle speed, vehicle mass, shock absorber movement min-max values, shock absorber movement frequency. Optionally, at least one another software application of the respective at least one another vehicle includes at least one of: a Bluetooth® module, a Wi-Fi® module, and the like to transmit the previously stored data to the software application of the vehicle. The technical effect is that the transmission of the previously stored data enables the use of the previously store data to reduce computational burden on the sensor arrangement of the vehicle and to increase a speed for predicting the at least one damping force.

Optionally, the received data from the at least one another vehicle is corrected using a correction factor. The correction factor is used to make needed adjustments perfectly fitting to different type of vehicles, i.e., taking into consideration different mass of vehicles, different speed, different types of shock absorbers etc. E.g., a vehicle whose mass is 2000 kg, the shock absorber movement is longer and frequency slower than in a vehicle whose mass is 1000 kg. The correction factor can be obtained for example from car producers or suspension manufacturers. By using the correction factor, the setting of suspension (i.e., damping force/characteristics) can be done for all vehicle types or models with different characteristics. Also, the correction factor can be used when there are different road types, i.e., for example when it is in advance known that a vehicle is mainly used for example on soft or hard surface, then the correction factor can be used from a first vehicle to the at least one another vehicle for setting the suspension. Beneficially, the correction factor is applied to the at least one another vehicle characteristics (such as type of vehicle, different mass of the vehicles, etc.) or road characteristics (such as road height estimates), previously generated from the sensor data to produce revised estimated another vehicle characteristics or road characteristics estimates. Moreover, constant updating of the correction factors may be applied to the sensed data to improve accuracy of the sensor arrangement and the system as a whole as more and more sensed data is collected from interactions between the vehicle, at least one another vehicle and various road irregularities encountered by the vehicle.

Optionally, the software application is configured to predict the at least one damping force value for the upcoming path up to a range of 1000 kms. The technical effect is that the system is able to beneficially predict the at least one damping force value up to a high distance of 1000 kms of the upcoming path in an accurate and precise manner. Thus, advantageously the user is provided with a hassle-free experience while travelling in the vehicle over long distance journeys.

Furthermore, the system comprises the control arrangement communicatively coupled with the software application and operatively coupled with the at least one actuator, wherein the at least one actuator is coupled with the damping system of the vehicle, and wherein the control arrangement is configured to control the at least one actuator to regulate the damping force based on the predicted damping force value. Throughout the present disclosure, the term "control arrangement" refers to an arrangement of control units that are used to control an operation or working of a specific component or device. Notably, in the system, the control arrangement is used to control the operation of the at least one actuator via the operative coupling of the control arrangement with the at least one actuator. It will be appreciated that the control arrangement is installed in the vehicle. Optionally, the control arrangement is installed in the chassis of the vehicle. Herein, the operative coupling of the control arrangement with the at least one actuator enables the control arrangement to give commands to the at least one actuator to control the operation of the at least one actuator. Notably, the communicable coupling between the software application and the control arrangement is used to communicate the predicted at least damping force value to the control arrangement. Subsequently, the control arrangement accordingly controls the operation of the at least one actuator to generate the damping force in the vehicle that is equal to the at least one damping force value.

Optionally, the software application is communicably coupled with the control arrangement via a wireless interface. In this regard, the wireless interface may be in form of a Wi-Fi® interface or a Bluetooth® interface which is already available in the user device, thus, advantageously no additional component is required to be installed in the system to communicably couple the software application with the control arrangement. The technical effect of the communicably coupling the software application with the control arrangement via the wireless interface is that the communicably coupling is easy to implement as no wired connection is required between the control arrangement and the software application.

Throughout the present disclosure, the term "actuator" refers to an electronic or mechanical device which converts energy into physical motion or force. It will be appreciated that the at least one actuator is present in the damping system to generate the damping force in the vehicle. Throughout the present disclosure, the term "damping system" refers to a set of components that are designed to absorb the vibrations and shocks that are imparted on the vehicle, using the damping force. Herein, shock absorbers are an essential part of the damping system. In this regard, the shock absorbers in the damping system use hydraulic fluid inside the shock absorbers to provide damping. Typically, the hydraulic fluid helps absorb the energy generated by the damping system's motion in response to bumps, potholes, or other road irregularities encountered by the vehicle. Such absorption of energy dampens the oscillations of the damping system, preventing excessive bouncing, pitching, or rolling of the vehicle. Moreover, as the hydraulic fluid is forced through small passages or valves inside the shock absorber, it converts the kinetic energy of the moving damping system into heat energy which is dissipated to prevent the shock absorber from overheating during prolonged use and ensuring consistent damping performance over time. Notably, the damping system ensures constant contact of tires of the vehicle with a road on which the vehicle moves, thus, providing better stability and comfort for passengers sitting in the vehicle. Optionally, design of the damping system varies based on a type of the vehicle and an intended purpose for which the vehicle is used. Subsequently, controlling the operation of the at least actuator leads to regulating the damping force in the vehicle. Notably, the control arrangement controls the operation of the at least one actuator such that to generate the damping force in the vehicle equal to the at least one damping force value before the vehicle reaches the upcoming path for which the at least one damping force value is generated.

Optionally, the control arrangement is operatively coupled with the at least one actuator in a wired manner. In this regard, wired connection between the control arrangement and the at least one actuator is established within the chassis of the vehicle. The technical effect of operatively coupling the control arrangement with the at least one actuator in the wired manner is that a more stable and strong connection is established between the control arrangement and the at least one actuator.

The present disclosure also relates to the method. Various embodiments and variants disclosed above, with respect to the aforementioned system, apply mutatis mutandis to the method.

Optionally, the at least one characteristic of the upcoming path or characteristics of the vehicle comprises at least one:

characteristic of an upcoming route of the vehicle,
driving characteristic of the vehicle,
speed of the vehicle,
configuration of the damping system,
acceleration of the vehicle,
orientation of the vehicle; or
weather data.

Optionally, the step of sensing data further comprises capturing signals containing information related to the at least one characteristic of the upcoming path transmitted from at least one another vehicle moving in front of the vehicle.

Optionally, the method further comprises enabling the user to provide a user input for predicting the at least one damping force value, wherein the user input is provided via at least one of: a voice input, a blinking of eyes, a movement of eyes, a movement of a body part of the user.

DETAILED DESCRIPTION OF THE DRAWINGS

Referring to FIG. 1, illustrated is an environment for implementing a system 100 for regulating a damping force of a vehicle 102, in accordance with an embodiment of the present disclosure. As shown in FIG. 1, the system 100 comprises a sensor arrangement 104 configured to sense data related to at least one characteristic 106 of an upcoming path 108 of the vehicle 102. Moreover, the system 100 comprises a software application 110 executable on a user device 112 associated with a user 114. The software application 110 is configured to receive the sensed data from the sensor arrangement 104 communicably coupled with the software application 110. Moreover, the software application 110 is configured to process the sensed data to predict at least one damping force value based on the at least one characteristic 106 of the upcoming path 108 of the vehicle 102. Furthermore, the system 100 comprises a control arrangement 116 communicatively coupled with the software application 110 and operatively coupled with at least one actuator 118, wherein the at least one actuator 118 is coupled with a damping system 120 of the vehicle 102, and wherein the control arrangement 116 is configured to control the at least one actuator 118 to regulate the damping force based on the predicted damping force value.

Figure 2:
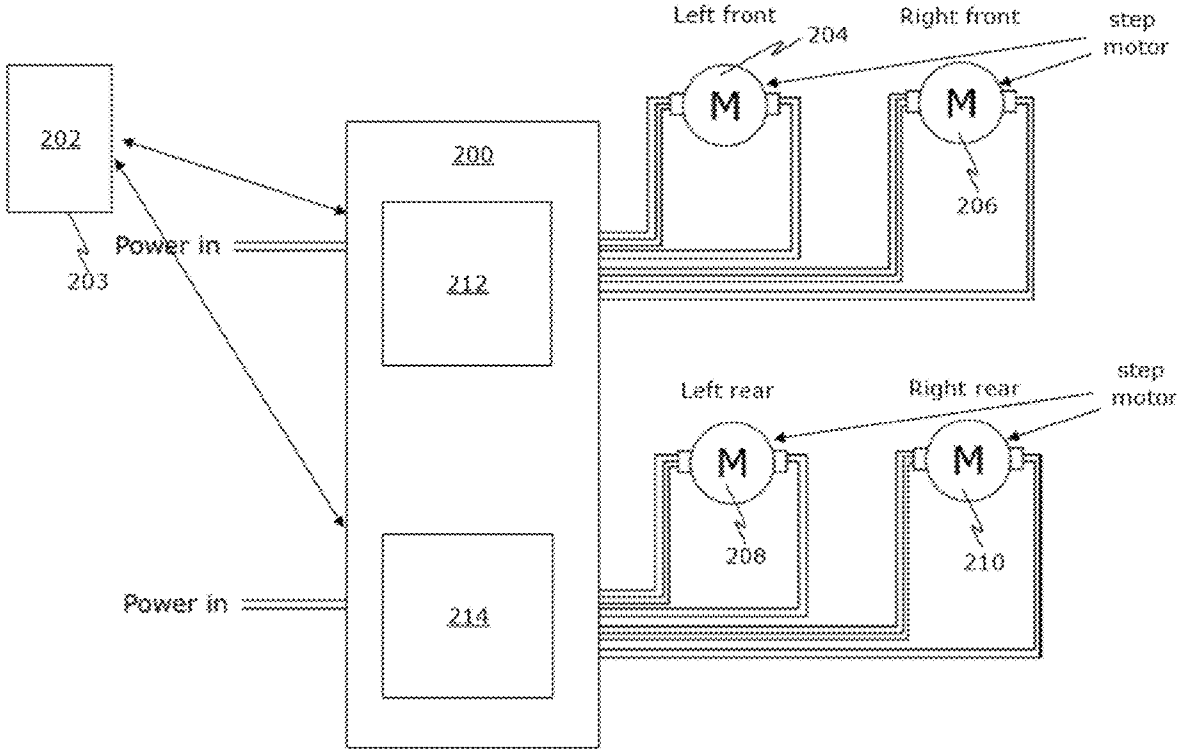
FIG. 2 is a schematic illustration of a control arrangement of a vehicle coupled with a software application and at least one actuator, in accordance with an embodiment of the present disclosure.

Referring to FIG. 2, illustrated is a schematic illustration of a control arrangement 200 of a vehicle coupled with a software application 202 executable on a user device 203 and at least one actuator (depicted as a first actuator 204, a second actuator 206, a third actuator 208 and a fourth actuator 210), in accordance with an embodiment of the present disclosure. As shown in FIG. 2, the control arrangement 200 comprises a first control unit 212 and a second control unit 214, where both the first control unit 212 and the second control unit 214 in the control arrangement 200 are communicably coupled to the software application 202 via a wireless interface. Moreover, the first control unit 212 is operatively coupled with the first actuator 204 and a second actuator 206, whereas the second control unit 214 is operatively coupled with a third actuator 208 and a fourth actuator 210. Furthermore, the first actuator 204 is operatively coupled with a damping system of the vehicle to act upon a left front wheel of the vehicle. Similarly, the second actuator 206 is operatively coupled with the damping system of the vehicle to act upon a right front wheel of the vehicle. Similarly, the third actuator 208 is operatively coupled with the damping system of the vehicle to act upon a left rear wheel of the vehicle. Similarly, the fourth actuator 210 is operatively coupled with the damping system of the vehicle to act upon a right rear wheel of the vehicle.

Figure 3:
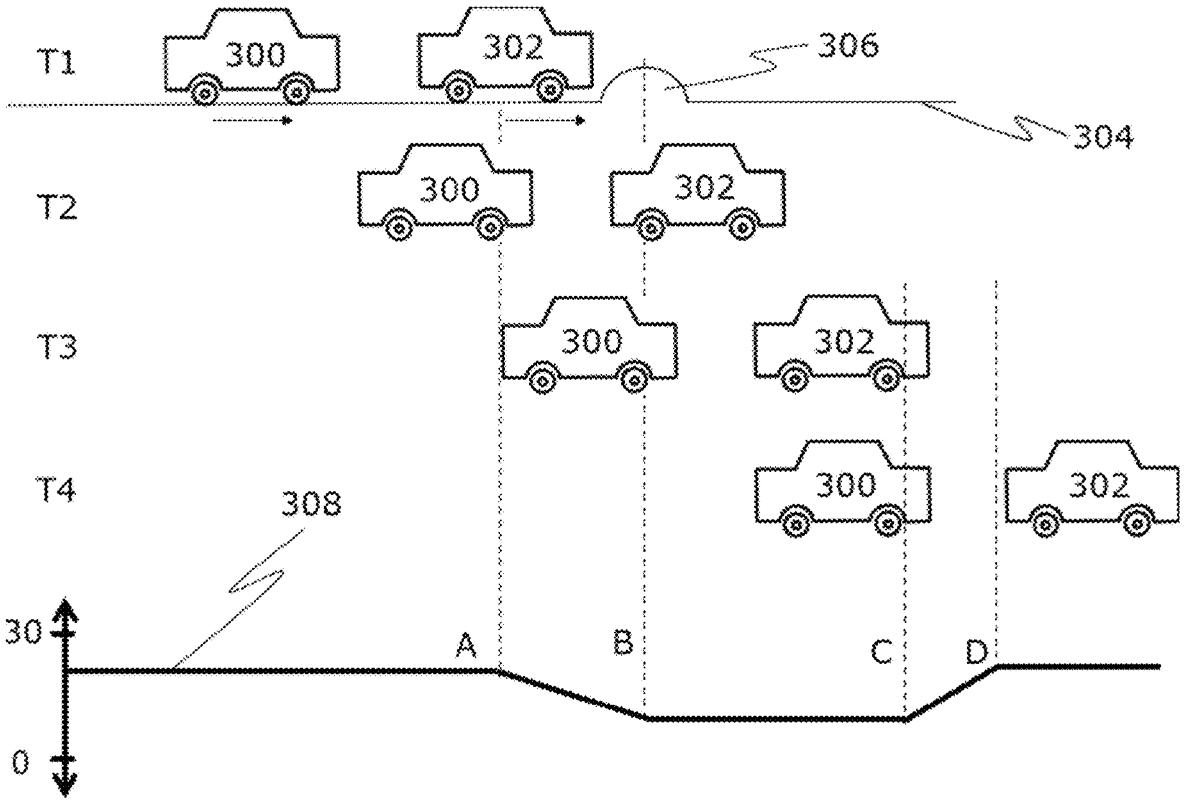
FIG. 3 is an implementation scenario depicting interaction of a vehicle with another vehicle in the system at different instances of time, in accordance with an embodiment of the present disclosure.

Referring to FIG. 3, illustrated is an implementation scenario depicting interaction of a vehicle 300 with another vehicle 302 at different instances of time, in accordance with an embodiment of the present disclosure. As shown in FIG. 3, at time instance T1 the another vehicle 302 is moving in front of the vehicle 300 over an upcoming path 304 of the vehicle 300 in a same direction, where the another vehicle 302 is at position A on the upcoming path 304. At time instance T1, another sensor arrangement of the another vehicle 302 senses data related to detection of a bump 306 at a position B on the upcoming path 304. Subsequently, a first another damping force value is adjusted for the another vehicle 302 based on the detection of the bump 306 on the upcoming path 304. Moreover, another sensor arrangement of the another vehicle 302 transmits the sensed data to update the previously stored data in the vehicle 300. At time instance T2, the vehicle 300 reaches the position A and based on the sensed data from the another vehicle 302, a first damping force value is predicted for the vehicle 300 as shown in a graph 308. Moreover, the another vehicle 302 has reached the position B where the bump 306 is located, while another damping force in the another vehicle 302 is reduced to the first another damping force value when the another vehicle 302 passes over the bump 306 on the upcoming path 304 as shown in the graph 308. At time instance T3, the vehicle 300 reaches the position B where the bump 306 is located, while damping force in the vehicle 300 is reduced in predictive manner to the first damping force value when the vehicle 300 passes over the bump 306 on the upcoming path 304 as shown in the graph 308. Moreover, the another vehicle 302 has reached a position C, where the another sensor arrangement in the another vehicle 302 senses data related to the detection of flat road on the upcoming path 304. Subsequently, a second another damping force value is adjusted for the another vehicle 302 based on the data related to the detection of the flat road on the upcoming path 304 as shown in the graph 308. At time instance T4, the vehicle 300 reaches the position C and receives the sensed data to update the previously stored data related to the detection of the flat road on the upcoming path 304 from the another vehicle 302. Subsequently, a second damping force value is predicted for the vehicle 300 based on the received sensed data related to the detection of the flat road on the upcoming path 304 as shown in the graph 308. Moreover, the another vehicle 302 has reached a position D where the flat road lies on the upcoming path 304. Subsequently, the another damping force in the another vehicle 302 is increased to the second another damping force value when the another vehicle 302 passes over the flat road on the upcoming path 304.

Figure 4:
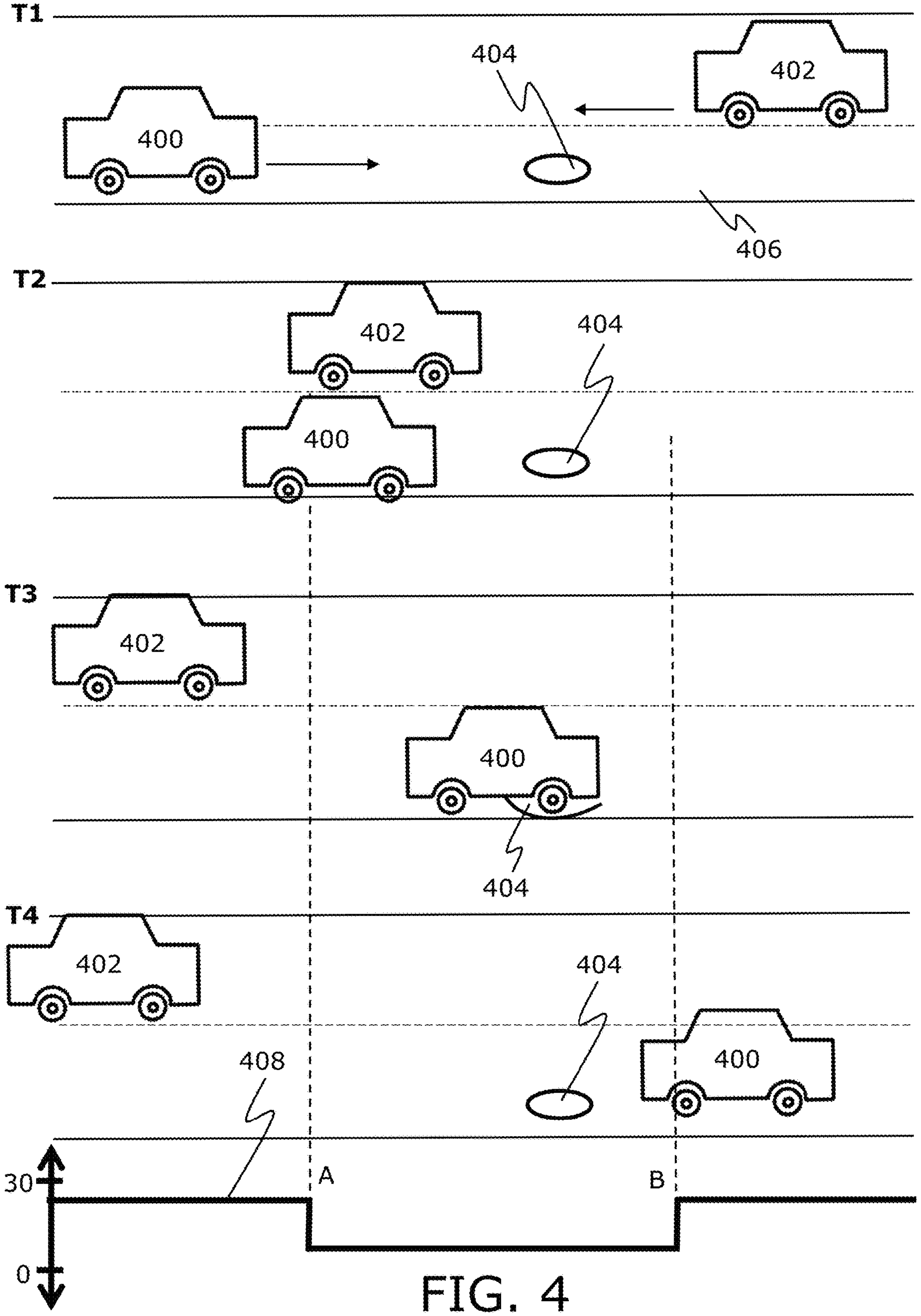
FIG. 4 is an implementation scenario depicting interaction of a vehicle with another vehicle in the system at different instances of time, in accordance with another embodiment of the present disclosure.

Referring to FIG. 4, illustrated is an implementation scenario depicting interaction of a vehicle 400 with another vehicle 402 at different instances of time, in accordance with another embodiment of the present disclosure. As shown in FIG. 4, the vehicle 400 and the another vehicle 402 moves in opposite directions. At time instance T1, another sensor arrangement in the another vehicle 402 senses data related to detection of a pothole 404 on an upcoming path 406 of the vehicle 400. At time instance T2, the vehicle 400 reaches position A on the upcoming path 406, where the vehicle 400 receives the sensed data related to the detection of the pothole 404 on the upcoming path 406 from the another vehicle 402 to update the previously stored data in the vehicle 400 using a sensor arrangement in the vehicle 400. Subsequently, a first damping force value is predicted for the vehicle 400 based on the received sensed data related to the detection of the pothole 404 on the upcoming path 406 as shown in a graph 408. At time instance T3, the vehicle 400 passes over the pothole 404 with a damping force in the vehicle 400 reduced to the first damping force value predicted for the vehicle 400 as shown in the graph 408. At time instance T4, the vehicle 400 reaches a position B on the upcoming path 406, where the sensor arrangement in the vehicle 400 senses data related to detection of a flat road on the upcoming path 406 of the vehicle 400. Subsequently, a second damping force value for the vehicle 400 is predicted based on the sensed data related to the detection of the flat road on the upcoming path 406 of the vehicle 400.

Figure 5:
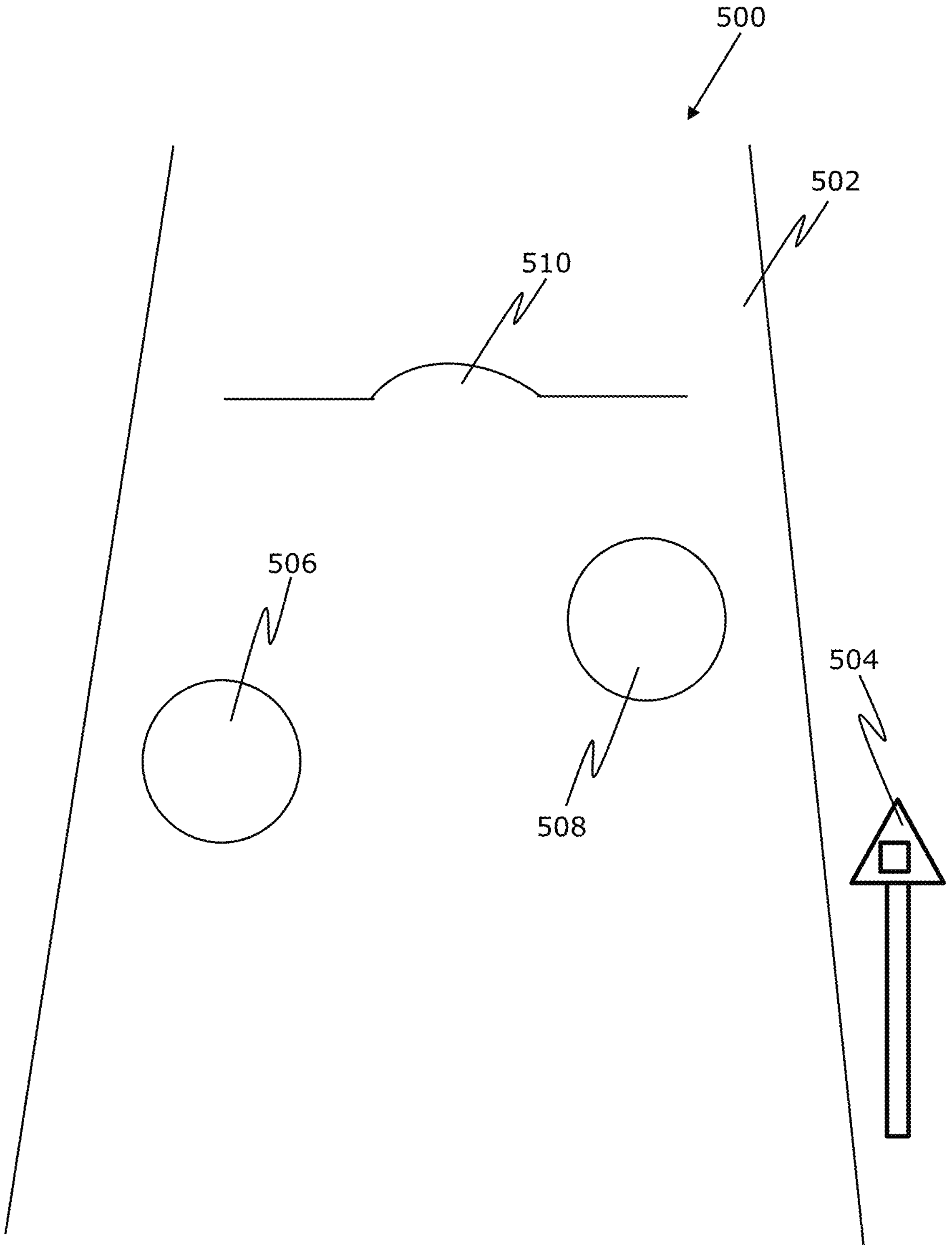
FIG. 5 is a captured view of a camera in a sensing arrangement, in accordance with an embodiment of the present disclosure.

Referring to FIG. 5, illustrated is a captured view 500 of a camera in a sensing arrangement, in accordance with an embodiment of the present disclosure. As shown in FIG. 5, the captured view 500 of the camera is part of a sensed data related to at least one characteristic of an upcoming path 502 of a vehicle in which the camera is installed. The at least one characteristic of the upcoming path 502 comprises detection of a sign board 504 that indicates presence of potholes on the upcoming path 502. Moreover, the at least one characteristic of the upcoming path 502 comprises detection of a first pothole 506, a second pothole 508 and a bump 510 on the upcoming path 502.

Figure 6:
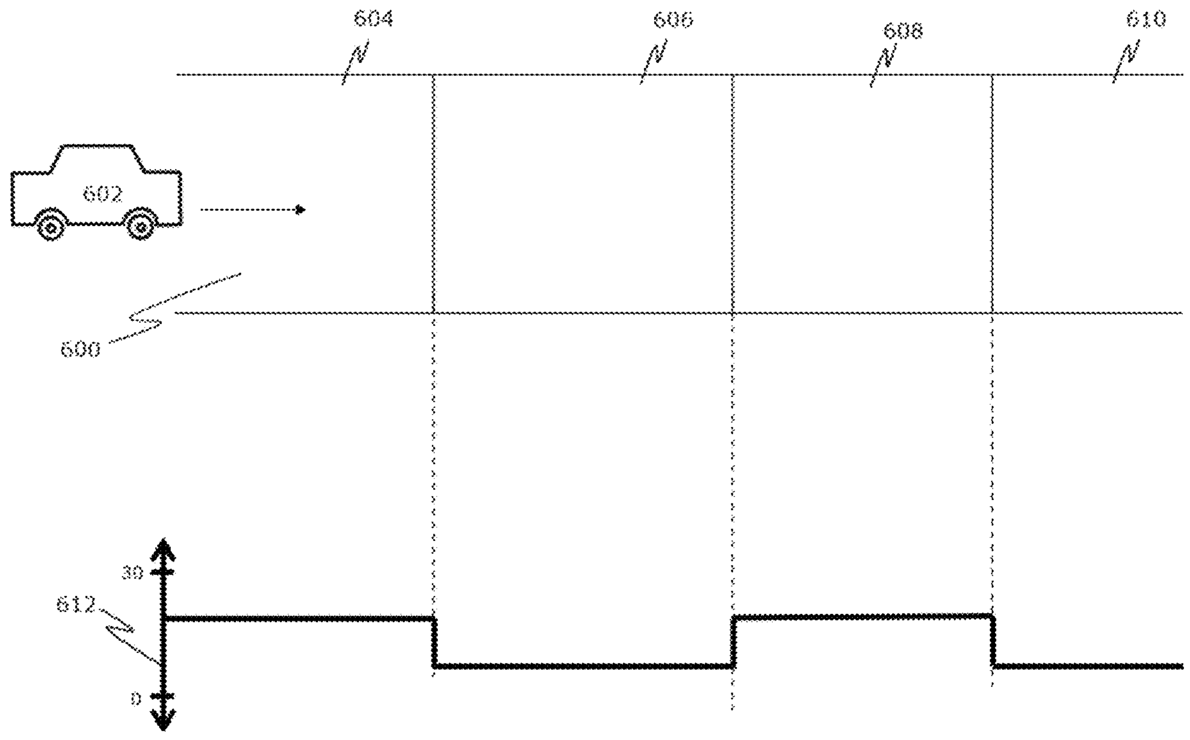
FIG. 6 is a schematic illustration of a plurality of damping force values predicted for respective plurality of parts of an upcoming path of a vehicle.

Referring to FIG. 6, illustrated is a schematic illustration of a plurality of damping force values predicted for respective plurality of parts of an upcoming path 600 of a vehicle 602. As shown in the FIG. 6, a sensor arrangement in the vehicle 602 senses that a first portion 604 of the upcoming path 600 is of an asphalt type, a second portion 606 of the upcoming path 600 is of a gravel type, a third portion 608 of the upcoming path 600 is of the asphalt type and a fourth portion 610 of the upcoming path 600 is of the gravel type. Subsequently, a software application executable on a user device in the vehicle 602 predicts a high damping force value for the first portion 604 of the upcoming path 600 as shown in a graph 612, based on the first portion 604 being of the asphalt type. Similarly, the software application executable on a user device in the vehicle 602 predicts a low damping force value for the second portion 606 of the upcoming path 600 as shown in the graph 612, based on the second portion 606 being of the gravel type. Similarly, the software application executable on a user device in the vehicle 602 predicts the high damping force value for the third portion 608 of the upcoming path 600 as shown in the graph 612, based on the third portion 608 being of the gravel type. Similarly, the software application executable on a user device in the vehicle 602 predicts the low damping force value for the fourth portion 610 of the upcoming path 600 as shown in the graph 612, based on the fourth portion 610 being of the gravel type.

Figure 7:
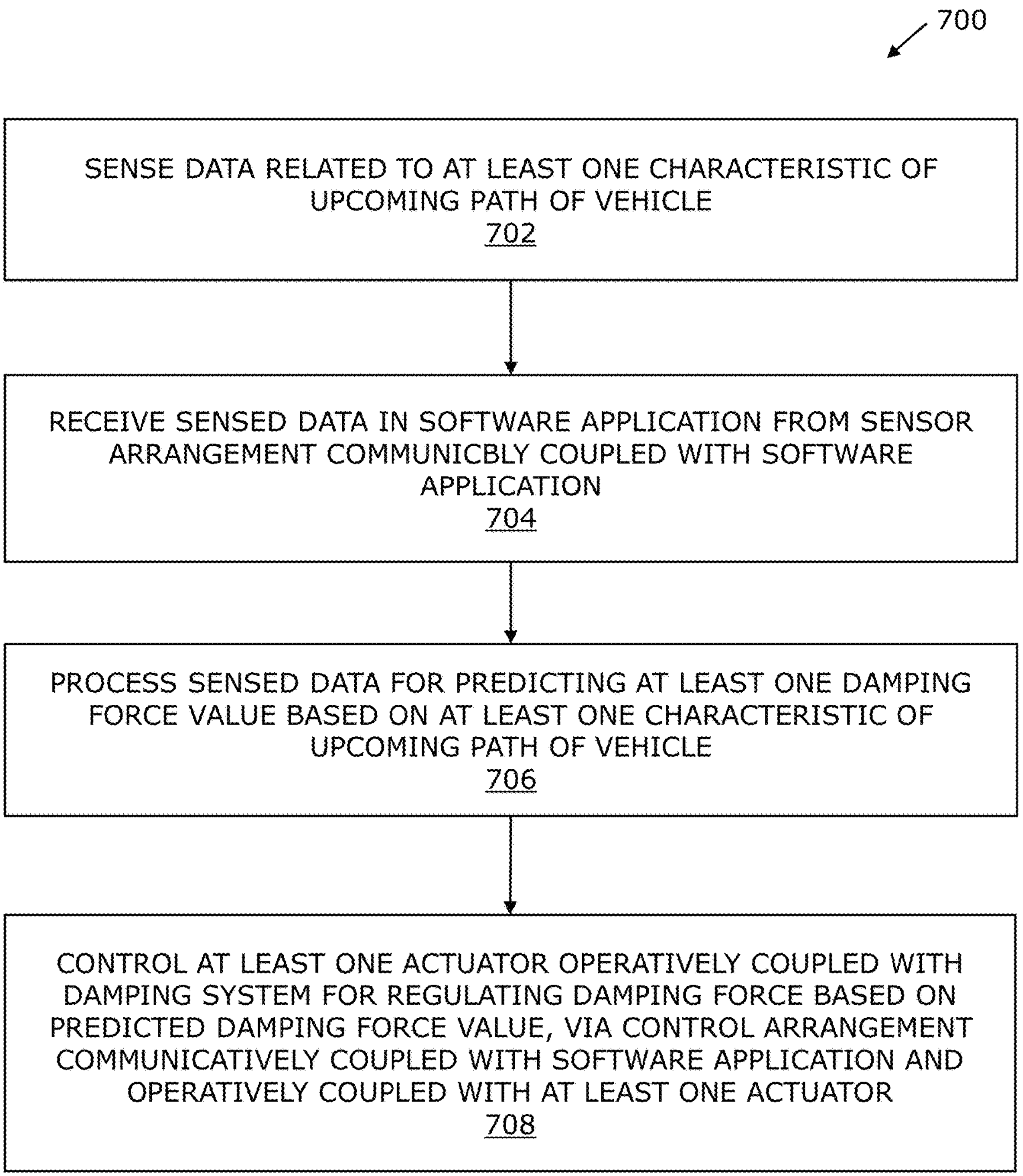
FIG. 7 is a flowchart depicting steps of a method for regulating a damping force of a vehicle, in accordance with an embodiment of the present disclosure.

Referring to FIG. 7, illustrated is a flowchart depicting steps of a method for regulating a damping force of a vehicle, in accordance with an embodiment of the present disclosure. At a step 702, data related to at least one characteristic of an upcoming path of the vehicle is sensed. At a step 704, the sensed data is received in a software application from a sensor arrangement communicably coupled with the software application. At a step 706, the sensed data is processed for predicting at least one damping force value based on the at least one characteristic of the upcoming path of the vehicle. At a step 708, an at least one actuator operatively coupled with a damping system is controlled for regulating the damping force based on the predicted damping force value, via a control arrangement communicatively coupled with the software application and operatively coupled with the at least one actuator.

The aforementioned steps 702, 704, 706 and 708 are only illustrative and other alternatives can also be provided where one or more steps are added, one or more steps are removed, or one or more steps are provided in a different sequence without departing from the scope of the claims herein.

The invention claimed is:

1. A system for regulating a damping force of a vehicle, the system comprising:

a sensor arrangement comprising at least a sound level meter (SLM), the sensor arrangement configured to sense data related to at least one characteristic, including sound levels, of an upcoming path of the vehicle, sound levels inside and outside the vehicle, and noise characteristics of vehicle parts, wherein the SLM is configured to sense the sound levels of the upcoming path, the sound levels inside and outside the vehicle, and the noise characteristics of the vehicle parts;

a user device associated with a user, on which a software application is executed, wherein when executing on the user device, the software application is configured to cause the user device to:

receive the sensed data from the sensor arrangement communicably coupled with the software application; and process the sensed data to predict at least one damping force value based on the at least one characteristic of the upcoming path of the vehicle; and a control arrangement communicatively coupled with the software application and operatively coupled with at least one actuator, wherein the at least one actuator is coupled with a damping system of the vehicle, and wherein the control arrangement is configured to control the at least one actuator to regulate the damping force based on the predicted at least one damping force value.

2. The system according to claim 1, wherein the sensor arrangement comprises at least one of: a Global Positioning System (GPS) sensor, a speedometer, a camera, an Inertial Measurement Unit (IMU) sensor.

3. The system according to claim 1, wherein the at least one characteristic of the upcoming path or characteristics of the vehicle further comprises at least one:

characteristic of an upcoming route of the vehicle,
driving characteristic of the vehicle,
speed of the vehicle,
configuration of the damping system,
acceleration of the vehicle,
orientation of the vehicle; or
weather data.

4. The system according to claim 2, wherein the camera in the sensor arrangement is configured to capture signals containing information related to the at least one characteristic of the upcoming path transmitted from at least one another vehicle.

5. The system according to claim 1, wherein the software application is further configured to enable the user to provide a user input to predict the at least one damping force value.

6. The system according to claim 5, wherein the user input is provided via at least one of: a voice input, a blinking of eyes, a movement of eyes, a movement of a body part of the user.

7. The system according to claim 1, wherein the software application is communicably coupled with the control arrangement via a wireless interface.

8. The system according to claim 1, wherein the control arrangement is operatively coupled with the at least one actuator in a wired manner.

9. The system according to claim 1, wherein the software application is further configured to:

receive previously stored data related to the at least one characteristic of the upcoming path from a storage unit communicably coupled to the software application; and process the previously stored data and the sensed data to predict the at least one damping force value.

10. The system according to claim 9, wherein the previously stored data is transmitted from the at least one another vehicle.

11. The system according to claim 1, wherein the software application is configured to predict the at least one damping force value for the upcoming path.

12. A method for regulating a damping force of a vehicle, the method comprising:

sensing data related to at least one characteristic, including sound levels, of an upcoming path of the vehicle, sound levels inside and outside the vehicle, and noise characteristics of vehicle parts, and using a sound level meter to sense the sound levels of the upcoming path, the sound levels inside and outside the vehicle, and the noise characteristics of the vehicle parts;

receiving the sensed data in a user device associated with a user, on which a software application is executed, wherein the sensed data is from a sensor arrangement communicably coupled with the software application;

processing the sensed data for predicting at least one damping force value based on the at least one characteristic of the upcoming path of the vehicle; and controlling an at least one actuator operatively coupled with a damping system for regulating the damping force based on the predicted at least one damping force value, via a control arrangement communicatively coupled with the software application and operatively coupled with the at least one actuator.

13. The method according to claim 12, wherein the at least one characteristic of the upcoming path or characteristics of the vehicle further comprises at least one:

characteristic of an upcoming route of the vehicle,
driving characteristic of the vehicle,
speed of the vehicle,
configuration of the damping system,
acceleration of the vehicle,
orientation of the vehicle; or
weather data.

14. The method according to claim 12, wherein the step of sensing data further comprises capturing signals containing information related to the at least one characteristic of the upcoming path transmitted from at least one another vehicle moving in front of the vehicle.

15. The method according to claim 12, further comprising enabling the user to provide a user input for predicting the at least one damping force value, wherein the user input is provided via at least one of: a voice input, a blinking of eyes, a movement of eyes, a movement of a body part of the user.

* * * * *